United States Patent [19]

Grever

[11] 4,447,690

[45] May 8, 1984

[54] INDUCTIVE PREHEATING OF UPSET TUBING

[75] Inventor: Arnold J. Grever, Colmar, Pa.

[73] Assignee: Selas Corporation of America, Dresher, Pa.

[21] Appl. No.: 335,189

[22] Filed: Dec. 28, 1981

[51] Int. Cl.³ .............................................. H05B 6/40
[52] U.S. Cl. .............................. 219/10.43; 219/10.79; 219/10.57; 219/10.69
[58] Field of Search ............... 219/10.41, 10.43, 10.69, 219/10.71, 10.57, 10.79, 10.49 R, 10.67, 10.75, 8.5

[56] References Cited

U.S. PATENT DOCUMENTS

| | | | | |
|---|---|---|---|---|
| 2,905,798 | 9/1959 | Freutel | ............................ | 219/10.43 |
| 3,649,798 | 3/1972 | Seyfried et al. | .................... | 219/10.79 |
| 3,762,912 | 10/1973 | Jacquerie et al. | ............ | 219/10.43 X |
| 3,827,275 | 8/1974 | Suttan et al. | .................. | 219/10.79 X |
| 4,093,839 | 6/1978 | Moliterno et al. | ............ | 219/10.41 X |
| 4,300,031 | 11/1981 | Reboux et al. | ................ | 219/10.79 X |

Primary Examiner—B. A. Reynolds
Assistant Examiner—Philip H. Leung
Attorney, Agent, or Firm—Austin R. Miller

[57] ABSTRACT

The induction preheating apparatus and methods of the present invention include a furnace for selectively preheating certain portions of irregularly shaped work objects prior to heating to a final uniform temperature in another furnace. The method includes selectively controlling the intensity of the induction magnetic field to provide magnetic field portions of higher intensity adjacent those portions of work objects tending to absorb less energy and magnetic field portions of lower intensity adjacent those portions of the work object tending to absorb energy at a higher rate. The method and apparatus of the present invention are used to achieve substantially uniform temperatures in irregularly shaped work objects after final heating in a main heating furnace.

4 Claims, 5 Drawing Figures ically prehaeating of upset tubing

BACKGROUND OF THE INVENTION

1. Field of the Invention

This invention relates to an induction heating furnace and more particularly to an induction preheating furnace for selectively preheating certain portions of work objects prior to heating, in a second furnace, to a uniform temperature.

2. Description of the Prior Art

In many types of furnaces, the rate of heating of a work object is directly proportional to the surface area of the object and inversely proportional to the mass of the object. Furthermore, uniform heating of a work object is very desirable for various metallurgical properties; for example, grain size uniformity, normalizing, and annealing and hardness uniformity through quenching.

Thus, certain problems are encountered in uniformly heating irregularly shaped objects, such as upset tubing for example. Specifically, the more massive portions of the objects are heated to a lower temperature than the less massive portions of the object. In the case of upset tubing, the upset portion is heated to a lower temperature than the body of the tube. Thus, the prior art developed induction and gas preheating of the more massive portions of work objects, such as the upset portions of upset tubing, prior to the final heating step in a second (non-induction type) main heating furnace.

Still further, as is disclosed in U.S. Pat. No. 4,093,839, granted to Moliterno, et al, selective induction heating of metallic tubing having a thickened portion, such as upset tubing, by selectively using high frequency and low frequency power sources, is known in the art.

Although the above-mentioned prior art has been successful in overcoming many of the problems in uniformly heating irregularly shaped objects, such as upset tubing, there remained the problem of non-uniform temperatures in different portions of the preheated sections, such as the upset section, after heating in a main heating furnace. In the case of upset tubing for example, the end of the upset tends to overheat in the main heating furnace because it has a larger surface area per unit of length of the upset, but an identical mass.

Furthermore, there remained the problem of higher temperatures, after final heating in a main heating furnace, in those portions of the work object immediately adjacent the preheated portions. Specifically, the end of the tube body connected to the upset tended to overheat in the main heating furnace because of some inadvertent preheating due to either conduction from the preheated upset portion or induction heating by the fringe magnetic field from the preheating induction coil.

Several solutions to the problem of non-uniform heating of irregularly shaped objects, such as upset tubing, have been proposed. In some applications a small gas-fired preheating furnace has been utilized. However, this has not solved any of the problems encountered in the prior art induction preheating furnaces.

Furthermore, it has been proposed to change the pitch (spacing of windings) of the preheating induction coil in order to selectively vary the intensity of the magnetic field produced by the coil. However, this solution has only been efective when irregularly shaped objects, all having the same size and shape, are preheated in a furnace specifically designed for preheating objects having that particular size and shape.

Thus, there has been a need in the art for a preheating furnace able to preheat certain portions of an irregularly shaped object, such as the upset portions of upset tubing, so that the entire object, including the entire preheated portion, will have a substantially uniform temperature after heating in a main heating furnace.

Furthermore, there has been a need for such a preheating furnace able to heat such portions having a wide variety of sizes, shapes and lengths; for example the upset portions of upset tubing, among others.

OBJECTS OF THE INVENTION

Thus, it is an object of the present invention to provide an induction preheating furnace for preheating certain portions of irregularly shaped objects, such as the more massive upset portions of upset tubing, so that the entire object, including the entire preheated portion, will have a substantially uniform temperature after heating in a main heating furnace.

It is another important object of the present invention to utilize such a furnace which can accommodate a wide variety of work objects having different shapes and sizes, including objects having portions, of varying sizes and shapes, requiring preheating.

SUMMARY OF THE INVENTION

The present invention pertains to a novel induction preheating method and means. More specifically, the invention also pertains to a preheating induction furnace for preheating certain portions of irregularly shaped objects, such as the more massive upset portions of upset tubing, for example.

BRIEF DESCRIPTION OF THE DRAWINGS

The invention, its organization, construction, and operation, will be best understood from the following detailed description taken in conjunction with the accompanying drawings, in which.

Figure 1:
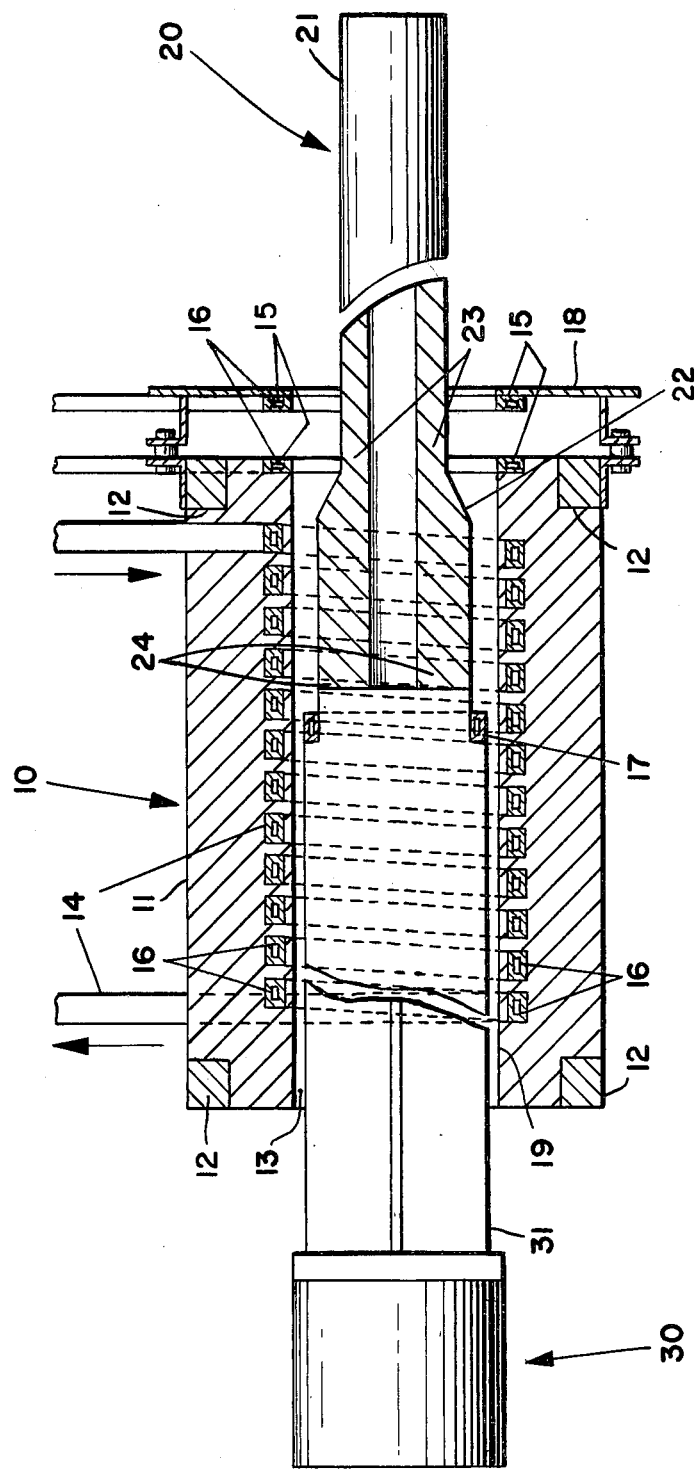
FIG. 1 is a side sectional view of one embodiment of an induction preheating furnace of the present invention.

Although specific forms of the invention have been selected for illustration in the drawings, and although specific terms will be used in the specification in describing the features illustrated therein, these are not intended to define or to limit the scope of the invention, which is defined in the appended claims.

DESCRIPTION OF THE PREFERRED EMBODIMENTS

The induction preheating furnace shown in the drawings will be generally designated 10. Furthermore, when referring to the induction preheating furnace 10 and/or any individual element thereof, the side or end closest to the end through which the work object is inserted shall be designated forward and the side or end closest to the end through which the upset stop is inserted shall be designated rearward.

Referring to FIG. 1, the induction preheating furnace 10 comprises a water cooled induction coil 14 within a ceramic furnace wall 11. Induction coil 14 is spaced annularly around bore 19 and furnace interior space 13. Induction coil 14 is composed of copper and has an inner channel 16 through which a coolant fluid, such as water, flows. Structural support means 12 are composed of a non-conducting material, such as wood, which help keep te ceramic furnace wall 11 intact.

At the forward end of induction preheating furnace 10 is attached steel bracket 18 supporting robber coil 15. Bracket 18 also aligns upset tubing 20 in the furnace interior space 13.

Upset tubing 20 comprises a tube body 21 and an upset portion 22. As can be seen from the drawings, upset portion 22 is more massive than tube body 21. Thus, it is necessary to preheat the upset portion 22 in order to achieve a substantially uniform temperature, after a final heating step in a uniform heating furnace, throughout upset tubing 20. Hence, upset tubing 20 is inserted into interior space 13 until upset portion 22 is substantially surrounded by induction coil 14. positioning means 30 provides a stop for upset tubing 20. Positioning means 30 moves horizontally and hence can be used to position upset tubing having varying upset lengths. Positioning means 30 includes positioning arm 31 and robber coil 17, having an inner channel 16 through which coolant fluid flows, positioned around the forward end of arm 31.

Thus, upset tubing 20 is inserted into interior space 13 until the end of upset 22 contacts positioning arm 31. Arm 31 is in a predetermined position so that upon contact of upset 22 and arm 31 substantially the entire upset 22 is surrounded by induction coil 14.

As can be seen from FIG. 1, when upset 22 is substantially surrounded by induction coil 14, the portion of tube body 21 adjacent upset 22 is surrounded by robber coil 15, having an inner channel 16 through which coolant fluid flows.

Thus, upset 22 is preheated to a higher temperature than tube body 21 in preparation for final heating of upset tubing 20 to a uniform temperature in a main heating furnace. Upset 22 is heated as an alternating current is provided through coil 14. The alternating current produces an alternating magnetic field which is strongest in the space surrounded by the turns of the coil 14. Induction or Joule heating occurs when an object having an electrical resistance, such as upset 22, is placed within the alternating magnetic field. The alternating magnetic field induces an alternating voltage in upset 22 and thus produces an alternating current in upset 22. By providing an alternating current through upset 22 having an electrical resistance, Joule heating is accomplished.

Upon insertion of the upset 22 into an alternating magnetic field produced by an induction furnace, heating is accomplished. Certain portions of the upset 22 tend to overheat due to their geometry, mass and location within the induction furnace during the time the magnetic field is caused to alternate. The heating of a portion of the upset is equal to the heat energy supplied by the alternating magnetic field less the heat energy lost due to conduction, convection and radiation. Thus, in a uniform alternating magnetic field, such as produced in certain induction heating coils, an object of uniform dimensions should be heated uniformly in a preheating operation prior to final heating in a main heating furnace. The heating of the upset 22 in a main heating furnace is proportional to the surface area per unit length of the mass of the upset 22, in addition to the heat retained from the preheating operation. The apparatus shown in FIG. 1 provides robber coils 15 and 17 adjacent to the portions 23 and 24, respectively, tending to overheat. Robber coils 15 and 17 tend to reduce the magnetic field at the portions 23 and 24 of upset 22 to facilitate non-uniform preheating of upset 22.

Figure 5:
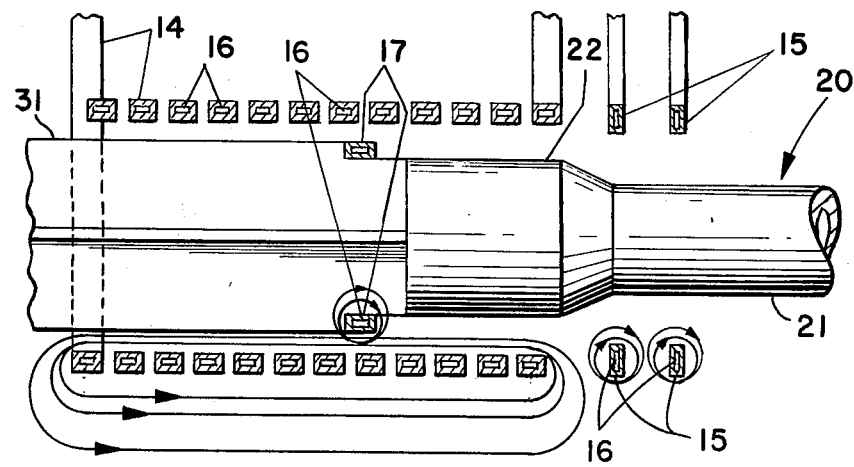
FIG. 5 is a sectional view of the induction preheating furnaces shown in FIGS. 1 through 4.

Robber coils 15 and 17 are not externally energized. However, as shown in FIG. 5, robber coils 15 and 17 are placed within the magnetic field (shown partially by the magnetic flux lines) produced by induction coil 14. Thus, an alternating voltage is induced in each of the robber coils 15 and 17. These induced voltages each generate an alternating current of opposite direction to the current flowing through coil 14. The net effect of these currents running through coils 14, 15 and 17 is a complex magnetic field having areas of greater intensity and areas of lesser intensity. Specifically, the magnetic field is less intense proximate the robber coils 15 and 17, and more intense near those parts of coil 14 not proximate robber coils 15 and 17. This phenomenon is shown diagrammatically, in FIG. 5 wherein the flux lines surrounding coils 15 and 17 are shown pointed in a clockwise direction and hence, tend to counteract the flux lines produced by the induction coil 14 shown pointed in a counterclockwise direction. The intensity of the magnetic field produced by robber coils 15 and 17 at portions 23 and 24 of upset 22 is greatly effected by the electrical resistance of the robber coils 15 and 17, that is to say, the electrical resistance of the work object must be larger than the electrical resistance of the robber coils 15 and 17 for a given induction heater.

Thus, robber coils 15 and 17 reduce the intensity of the magnetic field produced by induction coil 14 in the areas proximate the robber coils 15 and 17. Hence, a smaller voltage is induced in the upset tubing 20 in the portions proximate the robber coils 15 and 17, namely, portions 23 and 24. The smaller induced voltage produces a smaller current resulting in less Joule heating of portions 23 and 24.

Figure 2:
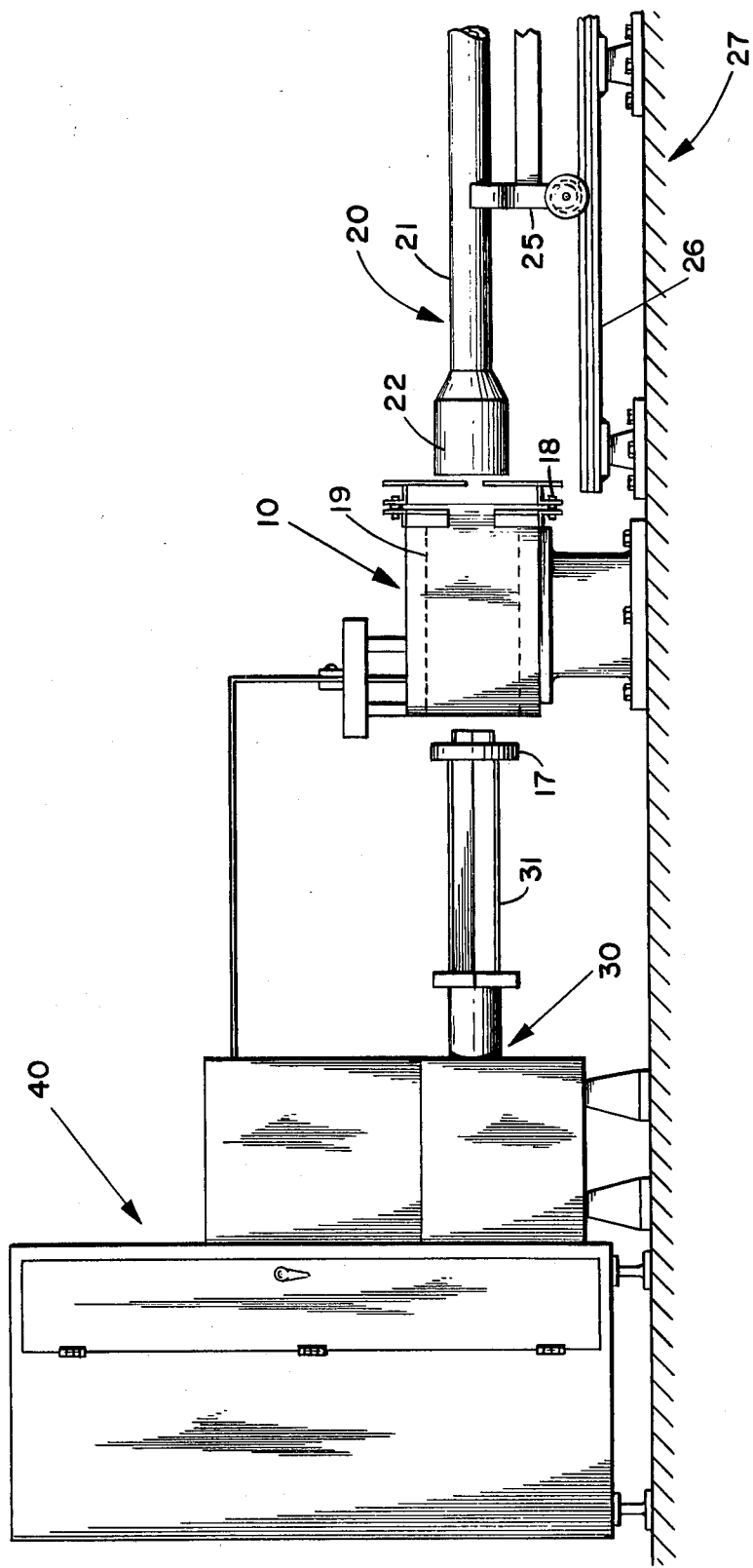
FIG. 2 is a side elevational view of the induction preheating furnace shown in FIG. 1.
Figure 3:
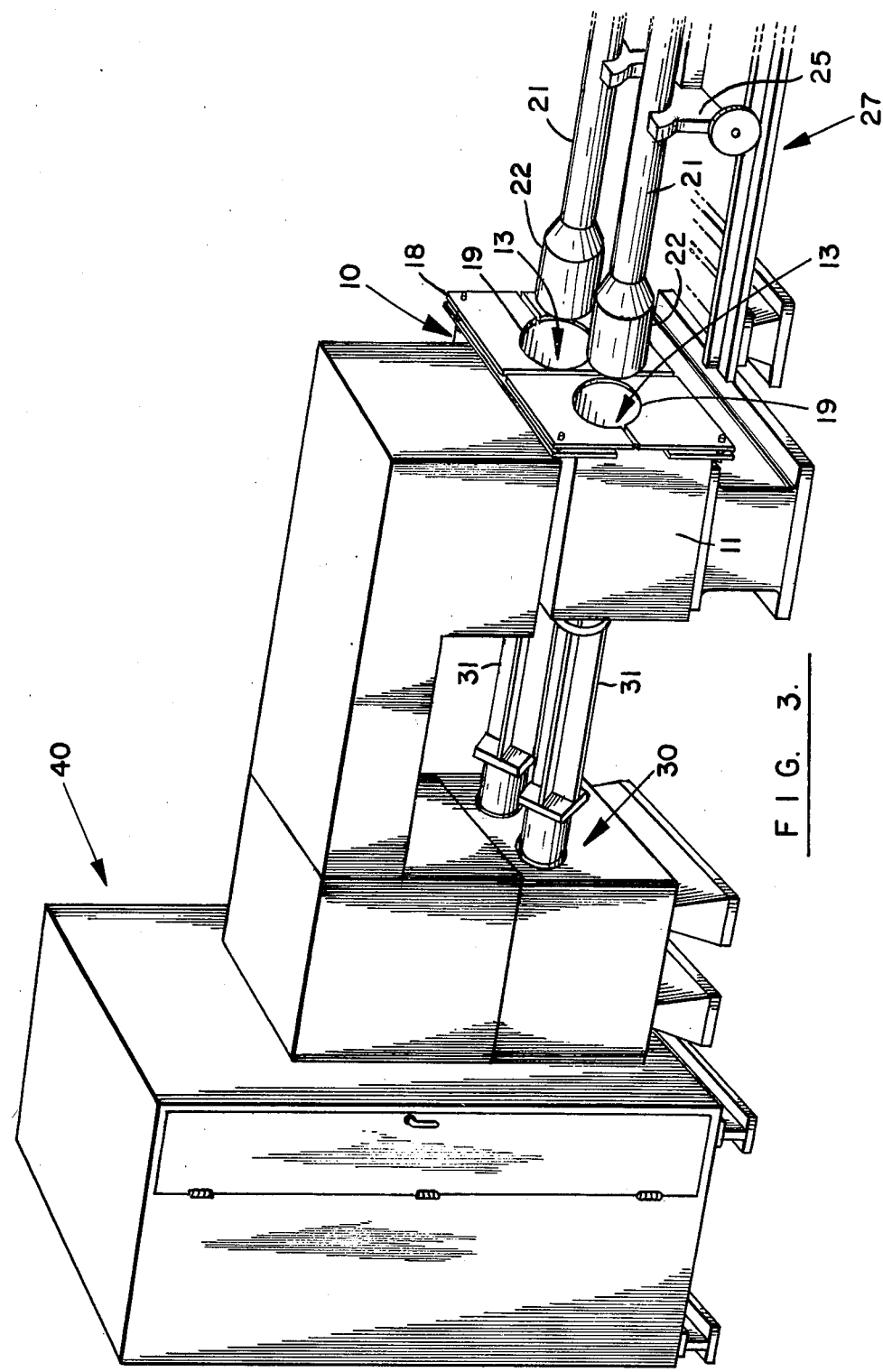
FIG. 3 is another isometric view, of the apparatus shown in FIG. 2, illustrating a tandom arrangement of two induction preheating furnaces.

Referring to FIGS. 2 and 3, the induction preheating furnace 10 is shown in relation to the power generating means 40, the positioning means 30 and the upset tubing insertion means 27.

Positioning means 30 typically includes a hydraulic piston capable of moving arm 31 horizontally in induction preheating furnace 10. As was stated above, arm 31 is set in a predetermined position and provides a stop for upset 22. As the lengths of the upsets vary, the hydraulic piston of positioning means 30 can be adjusted so that the entire length of the upset is positioned within the induction coil 14, with the part of the tube body immediately adjacent the upset, aligned with robber coil 15.

Also shown in FIGS. 2 and 3 are upset tubing insertion means 27. Insertion means 27 includes upset tubing holder 25 running on track 26. Thus, by rolling tube holder 25 either forward or rearward on track 26 the upset tubing 20 can be inserted and withdrawn from induction preheating furnace 10.

FIG. 3 shows a preferred embodiment of the present invention in which an induction preheating furnace 10 having two bores 19 threthrough is provided to concurrently preheat two upset tubings 20 in tandom.

Figure 4:
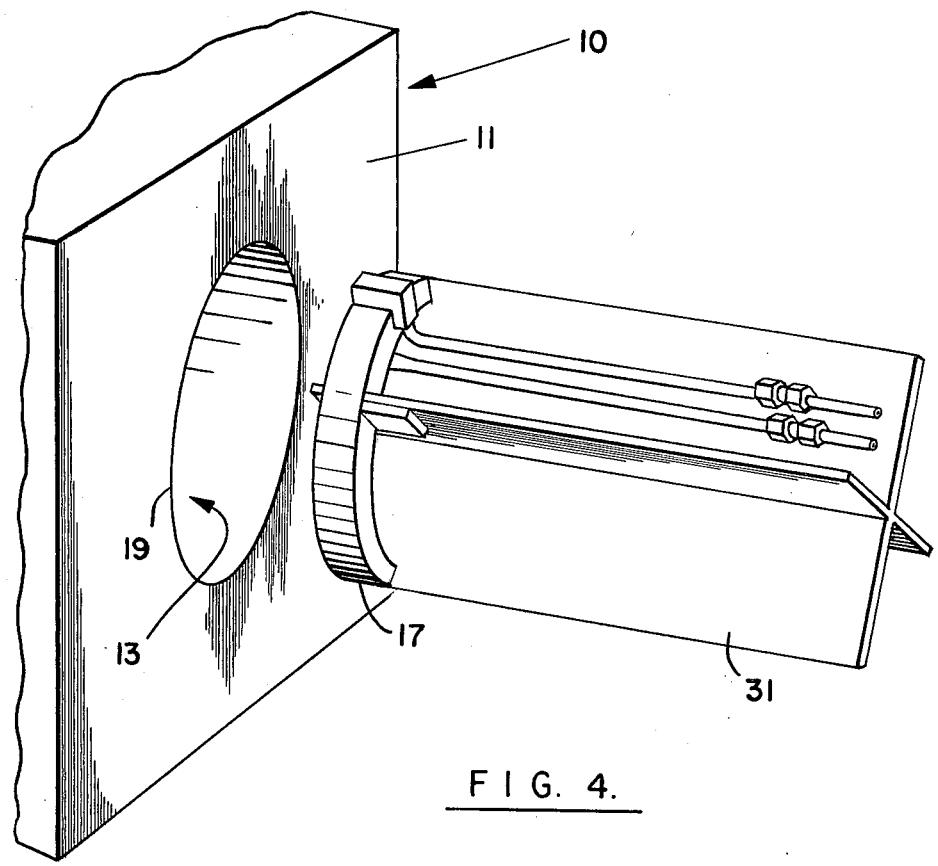
FIG. 4 is a side isometric view of the positioning arm and the rearward end of an induction preheating furnace, according to an embodiment of the present invention.

Referring to FIG. 4 of the drawings, the rearward end of induction preheating furnace 10 is shown with positioning arm 31 withdrawn. As can be seen, arm 31 has an "X" shaped cross section and has robber coil 17 positioned on its forward end.

Although this invention has been described in connection with specific forms thereof, it will be appreciated by those skilled in the art that a wide variety of equivalents maybe substituted for those specific elements and steps of operation shown and described herein, that certain features may be used independently of other features, and that parts may be reversed, all without departing from the spirit and scope of this invention as defined in the appended claims.

We claim:

1. In a method of heating an object to a substantially uniform temperature, said object having at least one portion tending to absorb energy at a higher rate when heated and at least one other portion tending to absorb energy at a lower rate when heated, the steps comprising:
   a. subjecting said portions of said object of induction preheating in a magnetic field, produced by an energized induction coil having a plurality of turns and at least one robber coil having at least one turn and placed within the magnetic field produced by said energized induction coil in close proximity to said portion of said object tending to absorb energy at a higher rate, while said object is positioned at a predetermined position within said magnetic field;
   b. controlling said magnetic field in a manner to provide controlled portions including one magnetic field portion adjacent said portion of said object which tends to absorb energy at a lower rate, thereby heating said portion of said object to a predetermined temperature, and further including another magnetic field portion adjacent said portion of said object which tends to absorb energy at a higher rate, wherein said magnetic field portion is of lesser magnitude than the magnetic field portion first mentioned, thereby heating said portion tending to absorb energy at a higher rate to a temperature which is lower than said predetermined temperature first mentioned;
   c. continuing the induction preheating of said portions of said object to reach said different predetermined temperatures at said different portions of said object;
   d. removing said object from said magnetic field; and
   e. post-heating said object with a separate heating means to a substantially uniform temperature.

2. In an apparatus for induction heating of an object having at least one portion which tends to absorb energy at a higher rate when heated and at least one other portion which tends to absorb energy at a lower rate when heated, including a preheating means for preheating the object to a non-uniform preheat temperature and a post-heating means for heating the object to a uniform final temperature, the combination of:
   a. magnetic field producing means including at least one energized induction coil having a plurality of turns;
   b. object insertion means for inserting said object within said magnetic field;
   c. magnetic field intensity controlling means, said controlling means controlling the preheating of said portion tending to absorb energy at a higher rate to a preheat temperature lower than a predetermined preheat temperature of said portion tending to energy at a lower rate, said controlling means including at least one robber coil having at least one turn and placed within the magnetic field of said energized induction coil and proximate said portion of said object tending to absorb energy at a higher rate providing at least one area of high magnetic field intensity and at least one area of low magnetic field intensity, said low intensity being lower than said high intensity;
   d. object positioning means for positioning said object at a predetermined position within said magnetic field such that said portion tending to absorb energy at a higher rate is proximate said magnetic field area of lesser intensity and said portion tending to absorb energy at a lower rate is proximate said magnetic field area of higher intensity;
   e. object removal means to remove said object from said magnetic field; and
   f. post-heating means for heating said object after removal from said magnetic field to a substantially uniform temperature.

3. In an apparatus for heating upset tubing, consisting of a tube body and a relatively thick walled upset, said upset having an end portion and the tube body having a portion adjacent said upset which portions tend to absorb energy at a higher rate when heated and a central portion, between said two above-mentioned portions, which tends to absorb energy at a lower rate when heated, including a preheating means for preheating the upset tubing to a substantially non-uniform preheat temperature and a post-heating means for heating the upset tubing to a uniform final temperature, the combination of:
   a. upset tubing preheating means comprising a magnetic field producing means, including at least one energized induction coil having a plurality of turns;
   b. upset tubing insertion means for inserting said upset of said upset tubing within said magnetic field;
   c. magnetic field intensity controlling means, said controlling means controlling the preheating of said portion tending to absorb energy at a higher rate to a preheat temperature lower than a predetermined preheat temperature of said portion tending to absorb energy at a lower rate, said controlling means including at least one robber coil having at least one turn and placed within the magnetic field of said energized induction coil and proximate said portion of said object tending to absorb energy at a higher rate providing at least one area of high magnetic field intensity and at least two areas of low magnetic field intensity, said low intensity being lower than said high intensity;
   b. upset tubing positioning means for positioning said upset at a predetermined position within said magnetic field such that said end portion and said portion adjacent said upset are proximate said magnetic field areas of low intensity and said central portion is proximate said magnetic field area of high intensity;
   e. upset tubing removal means for removing said upset from said magnetic field; and
   f. upset tubing post-heating means for non-uniformly heating said preheated upset tubing to a substantially uniform temperature.

4. The apparatus as defined in claim 2 or 3 wherein said substantially uniform temperature is higher than the preheat temperature configuration.

* * * * *